US011355254B2

(12) United States Patent
Coustourier et al.

(10) Patent No.: US 11,355,254 B2
(45) Date of Patent: Jun. 7, 2022

(54) LEAKAGE TESTING DEVICE FOR SEAL VERIFICATION BY PENETRANT INSPECTION OF A NUCLEAR FUEL ASSEMBLY LOCATED IN A CELL OF A STORAGE RACK

(71) Applicant: FRAMATOME, Courbevoie (FR)

(72) Inventors: Franck Coustourier, Chamagnieu (FR); Serge Roillet, Lyons (FR)

(73) Assignee: FRAMATOME, Courbevoie (FR)

( * ) Notice: Subject to any disclaimer, the term of this patent is extended or adjusted under 35 U.S.C. 154(b) by 352 days.

(21) Appl. No.: 16/485,057

(22) PCT Filed: Feb. 14, 2018

(86) PCT No.: PCT/EP2018/053680
§ 371 (c)(1),
(2) Date: Aug. 9, 2019

(87) PCT Pub. No.: WO2018/149876
PCT Pub. Date: Aug. 23, 2018

(65) Prior Publication Data
US 2019/0362862 A1 Nov. 28, 2019

(30) Foreign Application Priority Data
Feb. 15, 2017 (FR) ...................................... 17 51236

(51) Int. Cl.
G21C 17/07 (2006.01)
G21C 19/07 (2006.01)
(52) U.S. Cl.
CPC ............ G21C 17/07 (2013.01); G21C 19/07 (2013.01)
(58) Field of Classification Search
CPC ................................ G21C 17/07; G21C 19/07

USPC ......................................................... 376/251
See application file for complete search history.

(56) References Cited

U.S. PATENT DOCUMENTS

| 3,856,620 A | 12/1974 | Tomabechi |
| 4,034,599 A | 7/1977 | Osborne |
| 4,039,376 A | 8/1977 | Wachter |
| 4,072,559 A | 2/1978 | Neidl et al. |
| 4,082,607 A | 4/1978 | Divona |
| 4,248,666 A | 2/1981 | Olsson |
| 11,170,904 B2 | 11/2021 | Arguelles et al. |
| 2002/0075984 A1 | 6/2002 | Knecht et al. |

(Continued)

FOREIGN PATENT DOCUMENTS

| CN | 85109072 A | 6/1987 |
| CN | 102237149 A | 11/2011 |
| CN | 105981109 A1 | 9/2016 |

(Continued)

OTHER PUBLICATIONS

Corresponding Search Report PCT/EP2018/053680.

Primary Examiner — Jack W Keith
Assistant Examiner — Daniel Wasil

(57) ABSTRACT

A leakage testing device for testing leakage of a nuclear fuel assembly (18) by sipping. The device includes a collection assembly (32) that is configured to close an upper end (24A) of a cell (24) of a storage rack (22) for storing nuclear fuel assemblies discharged from a nuclear reactor (4). The closing prevents water contained in the cell from escaping via the upper end of the cell. The collection assembly is configured to collect products containing possible fission products released by a nuclear fuel assembly contained in the cell.

14 Claims, 4 Drawing Sheets

(56) References Cited

U.S. PATENT DOCUMENTS

2008/0130818 A1    6/2008  Pulmanns et al.

FOREIGN PATENT DOCUMENTS

| DE | 19924066 | A1 | 4/2000 |
| EP | 1810297 | B1 | 7/2007 |
| FR | 2315148 | A1 | 1/1977 |
| JP | 2013061199 | A | 4/2013 |

LEAKAGE TESTING DEVICE FOR SEAL VERIFICATION BY PENETRANT INSPECTION OF A NUCLEAR FUEL ASSEMBLY LOCATED IN A CELL OF A STORAGE RACK

The present invention relates to a device and a method for leakage testing by sipping of a nuclear fuel assembly.

A nuclear fuel reactor comprises a vessel in which a plurality of nuclear fuel assemblies are arranged together forming the core of the nuclear reactor. The vessel has a removable cover that must be removed to load and unload the nuclear fuel assemblies.

BACKGROUND

The nuclear reactor is generally arranged in a reactor well filled with water when the reactor is stopped, the well communicating with at least one pool that is also filled with water, making it possible to perform the maintenance operations.

Each nuclear fuel assembly contains nuclear fuel. More specifically, each nuclear fuel assembly comprises a bundle of nuclear fuel rods, each nuclear fuel rod comprising an elongate tubular cladding closed at both of its ends and containing nuclear fuel.

During operation, a coolant circulates through the core, along the nuclear fuel assemblies, and in particular along their nuclear fuel rods. The coolant keeps the core at an operating temperature and also serves as moderator for the nuclear reaction.

During its utilization in a nuclear reactor, a nuclear fuel rod of a nuclear fuel assembly can lose its integrity and have a leakage for example by piercing or cracking of the cladding of the rod. Such a leakage allows fission products resulting from the nuclear reaction to escape, in particular fission gases (xenon, krypton) and iodine components. These fission products become mixed with the coolant and can become deposited on the elements making up the nuclear reactor, thus increasing the level of radioactivity of the facility.

The claddings of the rods of the nuclear fuel assemblies make up the first confinement "barrier" of the fission products. During utilization, the monitoring of the tightness of the rods of the nuclear fuel assemblies loaded in a nuclear reactor is done by regular measurements of the radioactivity present in the coolant. The measurements of activities in gas and iodine components make it possible to detect a leakage and are used to estimate the number of affected rods, their burn-up, their location in the core and the size of the flaw(s). However, these measurements do not make it possible to determine which nuclear fuel assembly contains a fuel rod having a leakage. This determination takes place through individual inspection of the potentially affected spent nuclear fuel assemblies when the reactor is stopped, and to that end, the cover of the nuclear reactor vessel is removed.

To detect a potential leakage of a spent nuclear fuel assembly, it is possible to perform a leakage testing by sipping.

A leakage testing by sipping consists of causing a relative increase in the internal pressure of the nuclear fuel rods of a nuclear fuel assembly relative to the outside pressure. Since the pressures inside and outside the fuel rod tend to balance each other out naturally, a transfer of the fission products that are essentially in gaseous form inside the rod occurs toward the outside. The relative increase of the internal pressure of the fuel rods is for example obtained by causing an increase in the temperature of the nuclear fuel assembly or a decrease in the outside pressure.

It is possible to perform a leak testing by in-core sipping, i.e. in the nuclear reactor. The leakage testing by in-core sipping is done on the nuclear fuel assemblies in position in the core of the nuclear reactor. Examples of leakage testing devices by in-core sipping are disclosed in documents U.S. Pat. Nos. 3,856,620A, 4,082,607A, 4,248,666A, EP1183692B1 and EP1810297B1.

However, leakage testing by in-core sipping on a nuclear fuel assembly can be disrupted or interfered with by the presence of potential fission products trapped in the coolant and/or coming from adjacent assemblies. Furthermore, this leakage testing is only made possible for nuclear fuel assemblies including a housing surrounding the bundle of nuclear fuel rods and acting as sipping cell, as is the case for the nuclear fuel rods of boiling water reactors (BWR). Thus, such sipping devices have only a very limited effectiveness for nuclear fuel assemblies not including a housing, in particular nuclear fuel assemblies for pressurized water reactors (PWR).

It is possible to perform a leakage testing by sipping during the unloading of a nuclear fuel assembly outside the core, using a loading machine equipped with a sipping apparatus, as described in EP1183692B1. Indeed, due to its unloading, the nuclear fuel assembly is generally raised to a depth lower than that of the nuclear reactor, such that the pressure outside the nuclear fuel assembly decreases, which causes a release of fission products outside a nuclear fuel rod having a leakage. In particular released are gaseous fission products and water containing dissolved fission products and/or those in the form of suspended particles, thus making it possible to perform a leakage testing by sipping.

However, in some cases, in particular when the sipping apparatus is contaminated by fission products released by a previously verified nuclear fuel assembly, this loading machine does not make it possible to determine with certainty whether a nuclear fuel assembly has a leakage, and the nuclear fuel assembly can only be classified as "doubtful". It is then appropriate to perform a leakage testing by sipping in a dedicated sipping cell to confirm the leakage.

A leakage testing by sipping can be done in a sipping cell dedicated to sipping and arranged in a pool in communication with the reactor well in which the nuclear reactor is located. The sipping cell comprises one or several accommodations for receiving the nuclear fuel assembly/ies to be verified. Such sipping cells are disclosed in documents U.S. Pat. Nos. 4,072,559A, 4,039,376A and JP5726688B2.

It is possible to provide fixed sipping cells. However, in the old nuclear power plants, these sipping cells are also old, and their maintenance and update are costly.

It is possible to provide mobile sipping cells that can be installed specially in the pool during maintenance operations of the nuclear reactor and uninstalled once the maintenance operations are completed. However, such sipping cells are generally cumbersome, heavy, and time-consuming to install, decontaminate and uninstall.

In all cases, the leakage testing by sipping of each potentially affected nuclear fuel assembly requires handling the nuclear fuel assembly up to a sipping cell, performing the leakage testing by sipping, handling nuclear fuel assembly again outside the sipping cell, rinsing and optionally decontaminating the sipping cell before inserting a following nuclear fuel assembly. At the end of the leakage testing by sipping, the sipping cell must further be decontaminated. This therefore requires many handling operations of the nuclear fuel assemblies, which are time-consuming to perform and increase the risk of damaging a nuclear fuel assembly.

Furthermore, the sipping cells are placed in the pool. They must be compatible with their environment (anchor points, etc.) and must be designed for normal operation and in case of incident, in particular in case of earthquake. Such sipping cells represent a costly investment with respect to their episodic use.

SUMMARY OF THE INVENTION

The present disclosure provides a sipping device making it possible to perform leakage testing by sipping on nuclear fuel assemblies simply, quickly, inexpensively, while reducing or even eliminating the additional handling operations of these assemblies and limiting the interference effects that can distort the result of the leakage testing due to the presence of adjacent assemblies.

To that end, a leakage testing device is provided for testing leakage of a nuclear fuel assembly by sipping, comprising a collection assembly that is configured to close an upper end of a cell of a storage rack for storing nuclear fuel assembly/ies discharged from a nuclear reactor, so as to prevent water contained in the cell from escaping via the upper end of the cell, and to collect products containing possible fission products released by a nuclear fuel assembly contained in the cell.

The device may also include one or more of the following features, considered alone or according to all technically possible combinations:
- the collected products are gas and/or water contained in the cell,
- the potential fission products contained in the collected products are in gaseous form and/or dissolved in the water contained in the cell and/or suspended in the water contained in the cell,
- the collection assembly comprises a tube extender configured to be arranged at the upper end of the cell while extending the cell upward, a bell-shaped cover configured to cap the extender,
- a lower edge of the cover surrounds the extender while being located at a lower level than that of an upper edge of the extender,
- the extender and the cover are secured to one another so as to be able to be handled jointly,
- the cover has a pyramidal or conical shape converging upward,
- the cover comprises at least one tap to feed a pressurized gas below the cover,
- the cover comprises at least one tap to collect any fission products,
- the cover comprises a tap to perform both the feeding of the pressurized gas and the collection of any gaseous fission products,
- a control assembly separate from the collection assembly and connected to the collection assembly, the control assembly being configured for the analysis of products collected by the collection assembly to detect the possible presence of fission products,
- a heating unit configured to be arranged in the bottom of a cell and to support a nuclear fuel assembly received in the cell,
- a bubbling device configured to loosen fission product bubbles from the nuclear fuel assembly.

A method for testing leakage of a nuclear fuel assembly by sipping is also provided, the leakage testing being done while the nuclear fuel assembly is stored in a cell of a rack for storing nuclear fuel assemblies discharged from a nuclear reactor.

The method may also include one or more of the following features, considered alone or according to all technically possible combinations:
- the collection of products using a collection assembly configured to close an upper end of the cell so as to prevent water contained in the cell from escaping via the upper end of the cell, and the analysis of collected products to detect possible fission products released by the nuclear fuel assembly contained in the cell,
- the arrangement at the upper end of the cell of a tubular extender of the collection assembly to extend the cell upward, the extender being capped by a bell-shaped cover of the collection assembly,
- the leakage testing of several nuclear fuel assemblies arranged in the respective cells of the same storage rack, by moving the collection assembly successively from one of the cells to the other in order to test leakage of the nuclear fuel assemblies,
- the heating of a nuclear fuel assembly received in a cell, the heating is done using a heating unit attached at the bottom of the cell.

BRIEF SUMMARY OF THE DRAWINGS

The invention and its advantages will be better understood upon reading the following description, provided solely as a non-limiting example, and done in reference to the appended drawings, in which.

DETAILED DESCRIPTION

Figure 1:
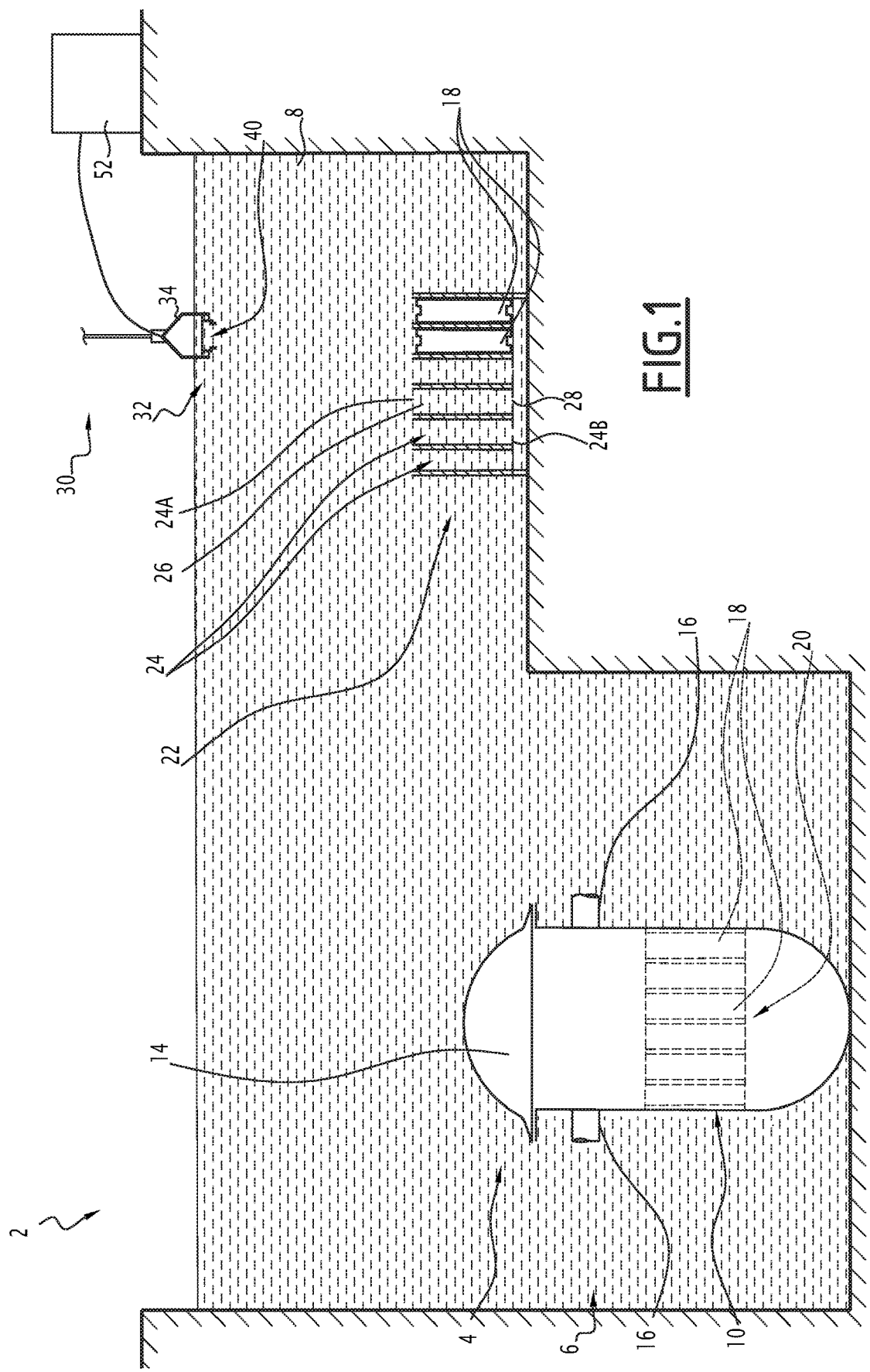
FIG. 1 is a schematic view of a nuclear power plant illustrating a nuclear reactor and a leakage testing device by sipping for testing leakage of nuclear fuel assemblies.

The nuclear power plant 2 illustrated in FIG. 1 comprises a nuclear reactor 4 arranged in a reactor well 6, and a storage pool 8 for storing nuclear fuel assemblies 18 discharged from a nuclear reactor 4. The storage pool 8 is in communication with the reactor well 6.

The reactor well 6 and the storage pool 8 are filled with water to provide radiological protection for the assembly. The water level is provided so that the handling necessary during maintenance operations, and in particular the handling of the nuclear fuel assemblies 18, are done underwater.

The nuclear reactor 4 comprises a vessel 10 and a cover 14 mounted removably on the vessel 10. The vessel 10 is connected to a primary circuit by tubings 16 for the circulation of a coolant through the vessel 10.

The nuclear reactor 4 is loaded with a set of nuclear fuel assemblies 18 arranged side by side and together forming the core 20 of the nuclear reactor 4. For the loading and unloading of the nuclear fuel assemblies 18, the cover 14 of the vessel 10 is removed, in order to free the access to the inside of the vessel 10.

The nuclear power plant 2 comprises one or several storage racks 22 arranged in the storage pool 8 and in particular configured to store nuclear fuel assemblies 18 discharged from the nuclear reactor 4, in particular during maintenance operations of the nuclear reactor 4.

A storage rack 22 comprises a plurality of individual tubular cells 24, each cell 24 being configured to receive a respective nuclear fuel assembly 18.

Each cell 24 is vertically elongated. Each cell 24 has an upper end 24A and a lower end 24B.

Each cell 24 has an upper opening 26 located at the upper end 24A of the cell 24 and a lower opening 28 located at the lower end 24B of the cell 24.

The upper opening 26 is sized for the insertion and removal of a nuclear fuel assembly 18 vertically. The lower opening 28 is arranged in a bottom configured to support a nuclear fuel assembly 18 received in the cell 24.

The lower opening 28 and the upper opening 26 allow the circulation of water from the bottom toward the top through the cell 24 by convection. When a nuclear fuel assembly 18 is received in the cell 24, this circulation allows a regulation of the temperature of the nuclear fuel assembly 18.

Each cell 24 has a sufficient height for a nuclear fuel assembly 18 inserted in a cell 24 to be fully contained in the cell 24.

During operations for maintenance and reloading with fuel of the nuclear reactor 4, all of the nuclear fuel assemblies 18 of the nuclear reactor 4 are discharged. When the presence of fission products has been detected beforehand in the coolant of the nuclear reactor 4, an exam is done to test leakage of the nuclear fuel assemblies 18 that are potentially affected. Indeed, for safety and radiological cleanliness reasons of the nuclear reactor 4, a nuclear fuel assembly 18 having a leakage cannot be reloaded in the nuclear reactor 4.

The nuclear power plant 2 is equipped with a leakage testing device 30 configured to perform leakage testing by sipping on the nuclear fuel assemblies 18.

Figure 2:
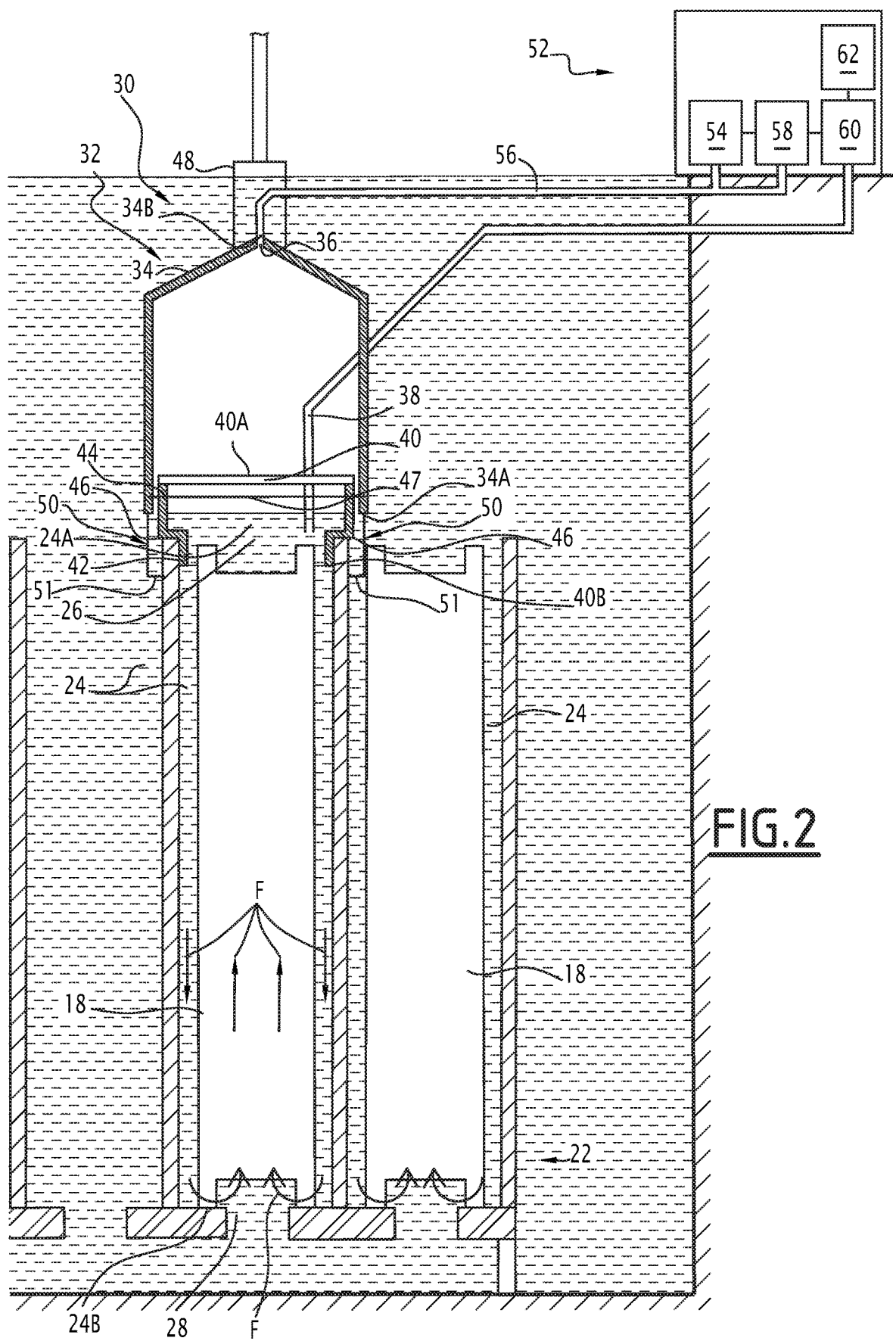
FIG. 2 is a schematic view of the leakage testing device by sipping and a portion of a rack for storing nuclear fuel assemblies discharged from the nuclear reactor.

As illustrated in FIGS. 1 and 2, the leakage testing device 30 is configured to perform leakage testings by sipping on nuclear fuel assemblies 18 stored in cells 24 of the storage rack 22.

The leakage testing device 30 comprises a collection assembly 32 configured to be arranged at the upper end 24A of a cell 24 of the storage rack 22, the collection assembly 32 being configured to close the upper end 24A of the cell 24 so as to prevent water from coming out through the upper end 24A of the cell 24 and to collect any gaseous fission products released by a nuclear fuel assembly 18 received in the cell 24.

The closing of the upper end 24A of the cell 24 makes it possible to cause an increase in the temperature of a spent nuclear fuel assembly 18 stored in the cell 24, due to its residual power. This power is produced primarily by the radioactivity of the nuclear fuel contained in the nuclear fuel assembly 18 as well as by the residual fissions. A sipping verification is more effective when it is done immediately after transfer of the nuclear fuel assembly 18 from the nuclear reactor 4 to the cell 24, the residual power of the nuclear fuel assembly 18 then being higher.

The collection assembly 32 comprises a cover 34 to close the upper end 24A of the cell 24 and to collect any gaseous fission products released by a nuclear fuel assembly 18 received in the cell 24.

The cover 34 assumes the form of a bell. The cover 34 delimits an inner volume. The cover 34 has a lower edge 34A and an apex 34B. Preferably, the cover 34 has a convergent shape over all or part of its height. The upper part of the cover 34 here has a pyramidal or conical shape converging toward the apex 34B.

The cover 34 comprises at least one tap to collect gases present below the cover 34. The branch to collect gases is preferably located near the apex 34B.

The cover 34 comprises at least one tap located on the cover 34 and making it possible to supply the cover 34 with pressurized gas, for example pressurized air.

The cover 34 filled with pressurized air and located above the cell 24 makes it possible to further limit the circulation of water in the cell 24, even inasmuch as the water cannot circulate in the cover 34. Conversely, gaseous fission products can escape from the water and be collected by the cover 34.

In the illustrated example, the cover 34 comprises a tap 36 to perform both the collection of gases trapped by the cover 34 and the bringing of pressurized gas below the cover 34. In a variant, the cover 34 comprises separate taps for gas collection and for the injection of pressurized gas.

Optionally, the cover 34 bears a temperature probe 38 configured to measure the temperature of the water contained in the cell 24 on which the sipping device is arranged. The temperature probe 38 is for example configured to be submerged in the water contained in the cell 24 when the collection assembly 32 is arranged on the upper end 24A of the cell 24.

Optionally, the cover 34 comprises a tap configured to withdraw water in the cell 24 on which the collection assembly 32 is arranged.

The cover 34 is for example formed by a mechanically welded assembly made from stainless steel, in particular AISI 304, 304L, 316 or 316L steel.

In the illustrated example, the collection assembly 32 comprises a tubular extender 40 configured to be arranged at the upper end 24A of the cell 24 so as to extend it upward.

The extender 40 makes it possible to extend the cell 24 past the upper edge of adjacent cells 24. In the operating position, the extender 40 protrudes relative to the adjacent cells 24. In particular, the extender 40 has an upper edge 40A located at a level higher than that of the upper ends 24A of the adjacent cells 24.

In the illustrated example, the extender 40 is configured to sink partially into the cell 24. The extender 40 has a lower portion 42 configured to be fitted into the cell 24, and an upper portion 44 provided to protrude upward from the cell 24 when the extender 40 is fitted into the cell 24.

The extender 40 has an outer shoulder 46 at the junction between the lower portion 42 and the upper portion 44. The outer shoulder 46 forms a stop limiting the pushing of the lower end 40B of the extender 40 into the cell 24.

The fitting of the extender 40 into the cell 24 ensures correct horizontal positioning of the extender 40 relative to the cell 24. Furthermore, the outer shoulder 46 ensures correct vertical positioning.

The extender 40 is for example formed by a mechanically welded assembly made from stainless steel, in particular AISI 304, 304L, 316 or 316L steel.

The cover 34 is configured to cap the extender 40. The cover 34 and the extender 40 thus cooperate effectively to close the upper end 24A of the cell 24 and collect the gases coming from the cell 24.

In particular, the extender 40 is partially engaged inside the cover 34. The lower edge 34A of the cover 34 is located at a level lower than that of the upper edge 40A of the extender 40.

With this configuration, when the collection assembly 32 is installed at the upper end 24A of a cell 24 and the cover 34 is filled with pressurized gas, the volume of pressurized gas can drop to a level lower than that of the upper edge 40A of the extender 40. The water contained in the cell 24 is thus prevented from coming out through the top of the cell 24, and therefore from passing through the cell 24. This is obtained without the lower edge 34A of the cover 34 interfering with the upper ends 24A of the adjacent cells 24.

As illustrated by the arrows F, the water contained in the cell 24 optionally circulates in a closed loop in the cell 24.

The lower edge 34A of the cover 34 has dimensions larger than those of the upper edge 40A of the extender 40 such that the extender 40 can engage inside the cover 34.

Preferably, the lower edge 34A of the cover 34 is located at a higher altitude than the upper end of the nuclear fuel assembly 18. This arrangement makes it possible to guarantee that the nuclear fuel assembly 18 always remains surrounded by water and therefore to satisfy the nuclear safety criterion requiring the presence of water to avoid any uncontrolled heating of the nuclear fuel assembly 18.

In one specific embodiment, the cover 34 and the extender 40 are secured to one another so as to be able to be handled jointly, as a single unit. The collection assembly 32 is therefore unitary. The cover 34 and the extender 40 here are connected by a horizontal rod 47 passing through the cover 34 and the extender 40. Optionally, the cover 34 and the extender 40 can form a single and same mechanically welded or bolted assembly.

The collection assembly 32 comprises a handling system 48 for handling the collection assembly 32. The handling system 48 here is positioned on the cover 34. The handling system 48 is for example configured to be able to be grasped using handling tools provided to handle nuclear fuel assemblies. Thus, the handling tools already provided to handle nuclear fuel assemblies make it possible to handle the collection assembly 32 without having to provide specific handling tools.

Optionally, the collection assembly 32 comprises a maintaining device 50 to keep the collection assembly 32 in position installed on a cell 24. The maintaining device 50 for example comprises a ballast. The ballast exerts a continuous vertical force retaining the collection assembly 32 on the cell 24. As a variant or addition, the maintaining device comprises a mechanical locking system 51. Such a locking system 51 for example comprises one or several hook(s) or latch(es) provided to engage with the storage rack 22. Such a locking system 51 is for example able to be actuated remotely using poles.

The leakage testing device 30 comprises a control assembly 52 that is separate and remote from the collection assembly 32.

As illustrated in FIG. 2, the control assembly 52 is provided to be placed on the edge of the storage pool 8 and is connected to the collection assembly 32, for example by pipes 56 and/or cables.

The control assembly 52 comprises a pressurized gas source 54, for example pressurized air, connected to the tap 36 of the cover 34 by a pipe 56, to supply the cover 34 with pressurized gas.

The control assembly 52 comprises a measuring device 58 connected to a tap 36 of the cover 34 by a pipe 56 in order to collect gases trapped by the cover 34, and configured to perform measurements on gases collected by the cover 34.

The measuring device 58 is for example configured to measure rays emitted by the collected gases, for example gamma rays and/or beta rays. The measuring device 58 is for example configured to take ray counting measurements.

The control assembly 52 comprises a computer 60 configured to analyze the measurement signals provided by the measuring device 58. The computer 60 is preferably configured to determine the possible presence of gaseous fission products in the collected gases based on measuring signals provided by the measuring device 58.

The control assembly 52 comprises a man-machine interface device 62 configured to restitute the result of analyses provided by the computer 60 for a user. The man-machine interface device 62 for example comprises a display screen that may or may not be touch-sensitive, a keyboard, a pointing device, a touch-sensitive slab and/or a printer.

Optionally, the computer 60 is configured to account for a temperature measuring signal provided by a temperature probe 38 equipping the collection assembly 32 and/or to restitute the temperature for the user via the man-machine interface device 62. Knowing the temperature makes it possible to monitor that the sipping is done under safe conditions, without boiling of the water contained in the cell 24.

Optionally, the measuring device 58 is configured to detect solid and/or dissolved gaseous fission products and/or fission products suspended in water sampled in the cell 24 using the collection assembly 32. The detection of the dissolved or suspended fission products is done for example by gamma ray counting measurements using a spectrometer. The detection of fission products dissolved and/or in suspension in the water makes it possible to improve the effectiveness of the detection.

A leakage testing method by sipping implemented using the leakage testing device 30 is described below.

The spent nuclear fuel assemblies 18 are discharged from the nuclear reactor 4 and each inserted into a cell 24.

In parallel and over the course of the discharge of the nuclear reactor 4, the collection assembly 32 is installed at the upper end 24A of a first cell 24. To that end, the lower portion 42 of the extender 40 is engaged in the cell 24. If applicable, a locking system 51 is activated to keep the collection assembly 32 secured to the cell 24. The collection assembly 32 is then in the position of FIG. 2. The extender 40 is arranged at the upper end 24A of the cell 24 so as to extend it vertically upward and the cover 34 caps the extender 40.

Pressurized gas is sent into the cover 34. The pressurized gas chases out the water present in the cover 34. A gas pocket is imprisoned under the cover 34 and prevents the water contained in the cell 24 from leaving through the upper opening 26 thereof. The pressurized gas is injected below the cover 34 using the pressurized gas source 54 connected to the cover 34 by the pipe 56.

The water present in the cell 24 gradually heats up due to the residual power of the nuclear fuel assembly 18. The presence of the cover 34 prevents the water from leaving the cell 24 as it would do by convection without the cover 34. Thus, the nuclear fuel assembly 18 is cooled less and its temperature increases.

The water present in the cell 24 possibly circulates in a closed loop in the cell 24 due to the convection. It heats up while circulating upward along the nuclear fuel assembly 18 and descends again along the walls of the cell 24.

Due to the temperature increase, the pressure inside the nuclear fuel rods of the nuclear fuel assembly 18 increases. If a nuclear fuel rod has a leakage, gaseous fission products escape from said rod of the nuclear fuel assembly 18, rise in the cell 24 and are collected by the cover 34.

The gases trapped below the cover 34 are led to the measuring device 58, measurements are done on these gases by the measuring device 58, and an analysis of the measuring signals is done by the computer 60.

The analysis results are restituted to a user by means of the man-machine interface device 62.

The leakage testing device 30 is next moved toward a cell 24 containing the next nuclear fuel assembly 18 to be verified.

The method preferably comprises the implementation of leakage tests successively on several nuclear fuel assemblies 18 located in respective cells 24 of the or several storage racks 22, by moving the leakage testing device 30 from one cell 24 to another in order to perform the following leakage testing.

Thus, several successive leakage tests can be done on several nuclear fuel assemblies 18 received in respective cells 24 without having to handle the nuclear fuel assemblies 18.

Furthermore, the nuclear fuel assemblies 18 discharged from a nuclear reactor 4 are generally stored in storage racks 22. Thus, the leakage testing of the nuclear fuel assemblies 18 can be done without additional handling of the nuclear fuel assemblies 18 relative to the normal manipulations, which represents a considerable time savings.

Optionally, the leakage testing can be done at the end of the discharge of the nuclear fuel assemblies 18 from the nuclear reactor 4.

The extender 40 makes it possible to extend the cell 24 above the adjacent cells 24, so as to be able to position the cover 34 effectively to trap possible gaseous fission products emitted by the nuclear fuel assembly 18 present in the cell 24.

In particular, the cover 34 can cap the extender 40 with the lower edge 34A of the cover 34 located at a level lower than that of the upper edge 40A of the extender 40, which prevents the gas from leaving the cover 34, at least as long as the pressure of the gases under the cover 34 is lower than the pressure of the water at the lower edge 34A of the cover 34.

Some "cold" nuclear fuel assemblies 18 have a lower residual power than others. If the residual power is too low, simply closing the upper end 24A of a cell 24 in which the nuclear fuel assembly 18 is stored due to the installation of the collection assembly 32 at the upper end 24A of the cell 24 can be insufficient for satisfactory sipping.

Figure 3:
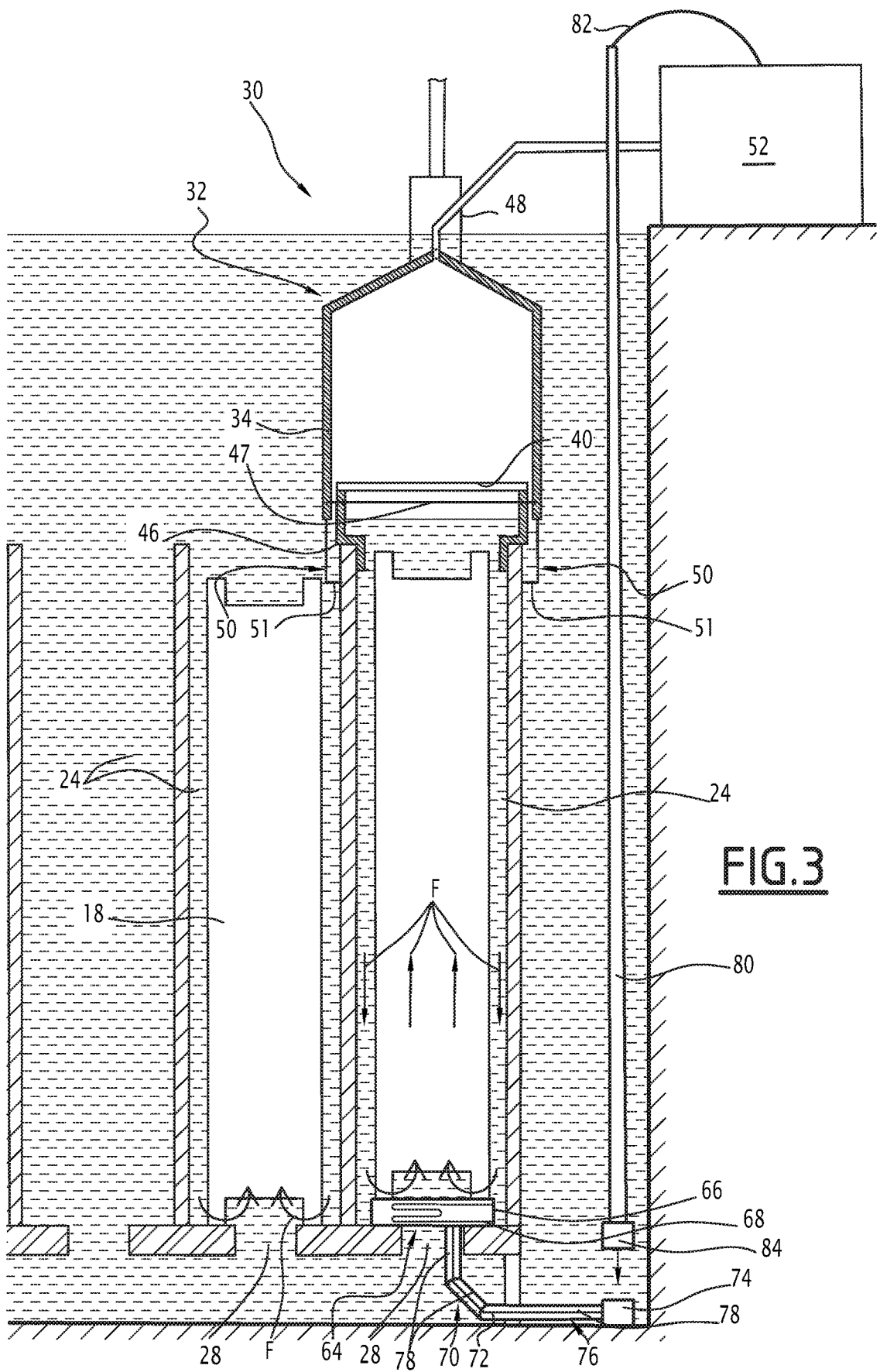
FIG. 3 is a view similar to that of FIG. 2 illustrating a leakage testing device by sipping according to one variant.

Optionally, as illustrated in FIG. 3, the leakage testing device 30 comprises a heating unit 64 configured to be inserted at the bottom of a cell 24 and to heat the water contained in the cell 24.

The heating unit 64 is configured to support a nuclear fuel assembly 18 stored in the cell 24. The heating unit 64 is thus sized to support the weight of a nuclear fuel assembly 18 stored in the cell 24.

The heating unit 64 is provided with a height that is as small as possible to prevent the nuclear fuel assembly 18 from protruding outside the cell 24.

The heating unit 64 for example comprises a parallelepiped box 66. The box 66 is for example formed by a mechanically welded assembly made from stainless steel, for example AISI 304, 304L, 316 or 316L steel.

The box 66 has water circulation passages to allow the circulation of water in the cell 24 vertically from the bottom toward the top when no sipping cycle is implemented in the cell 24.

The heating unit 64 comprises a heat source 68 to heat the water contained in the cell 24 during a sipping cycle. The heat source 68 here is a heating electrical resistance contained in the box 66. The heat source 68 is located in the box 66.

The heating unit 64 comprises an electrical power supply 70 to supply electricity to the heat source 68.

The electrical power source 70 comprises an electrical battery housed in the heating unit 64 and/or an electrical power cable to connect the heating unit 64 to a remote electrical power source.

The electrical power source 70 here comprises a power cable 72 that is provided to come out through the lower opening 28 of the cell 24 when the heating unit 64 is inserted in the cell 24 through the upper opening 26 of the cell 24. The power cable 72 is provided with an electrical connector 74 at its end opposite the heating unit 64.

Preferably, the heating unit 64 comprises a cable handling chain 76 carrying the power cable 72. Due to its weight and its flexibility, the cable handling chain 76 facilitates the passage of the cable through the lower opening 28 of the cell 24 during the insertion of the heating unit 64 into the cell 24.

In one specific embodiment, the cable handling chain 76 is configured such that once the heating unit 64 is inserted into the bottom of a cell 24, the electrical connector 74 rests on the bottom of the storage pool 8.

Preferably, the cable handling chain 76 comprises segments 78 articulated relative to one another such that the electrical connector 74 becomes offset laterally on a determined side relative to the heating unit 64 when the heating unit 64 is brought closer to the ground.

Thus, when the heating unit 64 is lowered into a cell 24, the cable handling chain 76 passes through the lower opening 28 of the cell 24, then the electrical connector 74 rests on the bottom of the storage pool 8, then shifts laterally when one continues to lower the heating unit 64.

Preferably, during operation, the heating unit 64 is inserted into a peripheral cell 24 of the storage rack 22 such that the electrical connector 74 shifts on the side of the storage rack 22 and is accessible on the side of the storage rack 22, as illustrated in FIG. 3.

The side on which the electrical connector 74 shifts depends on the orientation of the heating unit 64. Advantageously, the latter comprises a mistake-proofing mark making it possible to orient it correctly during its insertion into the peripheral cell 24, so as to ensure that the electrical connector 74 will come out on the side of the storage rack 22 and will be accessible from the edge of the storage pool 8.

For the connection to a remote electricity source, the leakage testing device 30 for example comprises a connecting pole 80 bearing an electrical connecting cable 82 provided at its lower end with an electrical connector 84 complementary to the electrical connector 74 of the power cable 72.

The operation of the sipping device is similar to that of the sipping device of FIG. 2, with the exception that the heat for the heating of the nuclear fuel assembly 18 is provided by the heating unit 64.

For the installation, the heating unit 64 is first installed at the bottom of the cell 24, then the nuclear fuel assembly 18 is inserted in the cell 24 so as to rest on the heating unit 64, then the collection assembly 32 is placed at the top of the cell 24. The heating unit 64 is possibly connected to an electricity supply source by means of its power cable 72 using a connecting pole 80.

Figure 4:
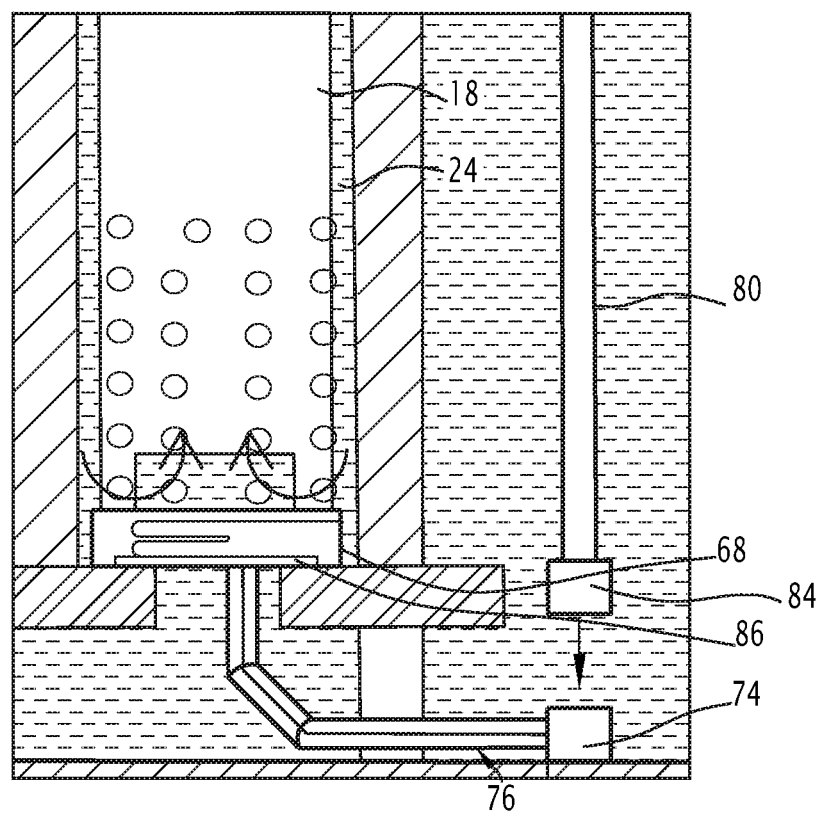
FIG. 4 is a partial view of a leakage testing device by sipping according to one variant, illustrating a heating unit and a bubbling device of this leak testing device by sipping.

In the variant illustrated in FIG. 4, the heating unit 64 further comprises a bubbling device 86 for generating gas bubbles, for example air bubbles, in order to improve the collection of fission products potentially glued on the tubular sheath of the nuclear fuel rods. The bubbling device 86 can be implemented independently of the heating unit 64, in particular in the case of the leakage testing for nuclear fuel assemblies 18 having a sufficient residual power.

During operation, the bubbles generated by the bubbling device 86 rise along the nuclear fuel assembly 18 and drive bubbles from gaseous fission products that are glued on the nuclear fuel assembly 18, in particular on nuclear fuel rods or grates of the nuclear fuel assembly 18. In other words, the bubbling device 86 is configured to loosen fission product bubbles from the nuclear fuel assembly 18. This therefore improves the effectiveness of the detection of leakages.

The bubbling device 86 for example is in the form of a trellis or ring(s), or toroid(s) with a short height making it possible to generate bubbles over all or part of the surface of the bubbling device 86 while arranging recesses for the circulation of water in the cell 24 when the cell 24 is not closed by a collection assembly 32.

To generate bubbles, the bubbling device 86 is for example connected to a gas source. It is possible to use the pressurized gas source 54 provided to fill the cover 34.

For this connection, the heating unit 64 for example comprises a supply pipe carried by the cable handling chain 76, the electrical connector 74 further being configured for a fluid connection of this supply pipe to a connecting pipe carried by the connecting pole 80 and connected to the gas source.

Owing to the leakage testing device and method, it is possible to test leakage of nuclear fuel assemblies 18 discharged from a nuclear reactor 4 by sipping simply, reliably and quickly.

The leakage testing is done directly in the storage rack 22 in which the nuclear fuel assemblies 18 discharged from the nuclear reactor 4 are stored.

It is not necessary to have a dedicated fixed or mobile sipping cell separate from the storage rack 22, or to handle the stored nuclear fuel assemblies 18 in order to verify nuclear fuel assemblies 18 having a sufficient residual power.

The leakage testing is further done outside the nuclear reactor 4, which limits the handling operations above the nuclear reactor 4 itself and therefore limits the risks inherent to such procedures.

The leakage testing device and method further make it possible to perform leakage testing of "cold" nuclear fuel assemblies 18 in a cell 24 equipped with a heating unit 64.

The leakage testing device 30 is light, compact and easy to install and uninstall. It makes it possible to shorten the procedure times and reduce the risks of damaging the nuclear fuel assemblies 18, since it makes it possible to reduce the handling of the nuclear fuel assemblies 18, in particular when they have a sufficient residual power. The leakage testing with the leakage testing device 30 only requires moving the leakage testing device 30 from one cell 24 to another, thus allowing non-negligible time savings during the successive testing of several nuclear fuel assemblies 18.

The leakage testing device 30 uses the storage rack 22 already present in the storage pool 8. Thus, it is not necessary to provide additional anchor points in the storage pool 8, as is for example the case for a dedicated fixed or mobile sipping cell. It is also no longer necessary to provide cumbersome and costly studies to justify its behavior in case of accident to the nuclear safety authorities.

The contamination risks of the leakage testing device 30 by direct contact with a nuclear fuel assembly 18 are eliminated.

The leakage testing device 30 makes it possible to perform several successive leakage tests using a same collection assembly 32 without having to perform rinsing or decontamination between two successive leakage tests.

The leakage testing device and method is not limited to the example embodiments described above. Alternatives can be considered.

The leakage testing device 30 here comprises a single collection assembly 32. In a variant, the leakage testing device 30 comprises several collection assemblies 32. This makes it possible to perform several leakage tests on several respective nuclear fuel assemblies 18 in parallel or to perform a leakage test on a nuclear fuel assembly 18 using a collection assembly 32 during the preparation of another leakage test on another nuclear fuel assembly 18 using another collection assembly 32.

When the leakage testing device 30 comprises several collection assemblies 32, it is possible to provide a control assembly 52 shared by several collection assemblies 32 and able to be connected to one of these collection assemblies 32 at a time. The shared control assembly 52 is then successively connected to the different collection assemblies 32.

In the illustrated examples, the extender 40 bears on the cell 24 on which the collection assembly 32 is installed. Optionally or in a variant, the extender 40 is configured to bear on one or several cells 24 adjacent to the cell 24 on which the collection assembly 32 is installed. This makes it possible to distribute the weight of the collection assembly 32 over several cells 24.

In the illustrated examples, among the cover 34 and the extender 40, only the latter bears on the cell 24. In a variant or optionally, the cover 34 bears on the cell 24 on which the collection assembly 32 is installed and/or on one or several cells 24 adjacent to the cell 24 on which the collection assembly 32 is installed.

What is claimed is:

1. A leakage testing device for testing leakage of a nuclear fuel assembly by sipping, comprising:
    a collection assembly configured to close an upper end of a cell of a storage rack for storing at least one nuclear fuel assembly discharged from a nuclear reactor, so as to prevent water contained in the cell from escaping via the upper end of the cell, and to collect products containing possible fission products released by a nuclear fuel assembly contained in the cell, wherein the collection assembly comprises a tube extender configured to be arranged at the upper end of the cell while extending the cell upward, a bell-shaped cover configured to cap the extender.

2. The leakage testing device according to claim 1, wherein a lower edge of the cover surrounds the extender while being located at a lower level than that of an upper edge of the extender.

3. The leakage testing device according to claim 1, wherein the extender and the cover are secured to one another so as to be able to be handled jointly.

4. The leakage testing device according to claim 1, wherein the cover has a pyramidal or conical shape converging upward.

5. The leakage testing device according to claim 1, wherein the cover comprises at least one tap to feed a pressurized gas below the cover.

6. The leakage testing device according to claim 1, further comprising a control assembly separate from the collection assembly and connected to the collection assembly, the control assembly being configured for the analysis of products collected by the collection assembly to detect the possible presence of fission products.

7. The leakage testing device according to claim 1, further comprising a heating unit configured to be arranged in the bottom of a cell and to support a nuclear fuel assembly received in the cell.

8. The leakage testing device according to claim 1, further comprising a bubbling device configured to loosen fission product bubbles from the nuclear fuel assembly.

9. A method for testing leakage of a nuclear fuel assembly, comprising:

leakage testing the nuclear fuel assembly by the leakage testing device as recited in claim 1 by sipping while the nuclear fuel assembly is stored in the cell of the storage rack.

10. The leakage testing method according to claim 9, further comprising collecting products using the collection assembly, and analyzing collected products to detect possible fission products released by the nuclear fuel assembly contained in the cell.

11. The leakage testing method according to claim 10, further comprising
arranging the extender at the upper end of the cell to extend the cell upward, the extender being capped by the bell-shaped cover.

12. The leakage testing method according to claim 9, further comprising testing leakage of several nuclear fuel assemblies arranged in respective cells of the same storage rack, by moving the collection assembly successively from one of the cells to the other in order to test leakage of the nuclear fuel assemblies.

13. The leakage testing method according to claim 9, further comprising heating the nuclear fuel assembly in the cell.

14. The leakage testing method according to claim 13, wherein the heating is performed using a heating unit attached at the bottom of the cell.

\* \* \* \* \*